US008175548B2

(12) United States Patent
O'Keeffe et al.

(10) Patent No.: US 8,175,548 B2
(45) Date of Patent: May 8, 2012

(54) METHOD AND DEVICE FOR TRANSMITTING A SEQUENCE OF TRANSMISSION BURSTS

(75) Inventors: Conor O'Keeffe, Cork (IE); Denis Dineen, Cork (IE); Paul Kelleher, Classis Lake (IE)

(73) Assignee: Freescale Semiconductor, Inc., Austin, TX (US)

( * ) Notice: Subject to any disclaimer, the term of this patent is extended or adjusted under 35 U.S.C. 154(b) by 1066 days.

(21) Appl. No.: 11/910,067

(22) PCT Filed: Mar. 30, 2005

(86) PCT No.: PCT/EP2005/003491
§ 371 (c)(1),
(2), (4) Date: Sep. 28, 2007

(87) PCT Pub. No.: WO2006/102922
PCT Pub. Date: Oct. 5, 2006

(65) Prior Publication Data
US 2008/0207141 A1  Aug. 28, 2008

(51) Int. Cl.
*H04J 3/00* (2006.01)
*H04B 1/02* (2006.01)
(52) U.S. Cl. ........... 455/91; 370/337; 370/335; 370/336
(58) Field of Classification Search ............... 455/67.11, 455/423, 434, 450, 466, 91, 102; 370/335, 370/336, 337, 350, 442; 375/347, 349
See application file for complete search history.

(56) References Cited

U.S. PATENT DOCUMENTS

| 5,722,040 A | 2/1998 | Bjerede et al. |
| 5,772,040 A | 6/1998 | Tomiyama et al. |
| 6,408,340 B1 | 6/2002 | Janssen et al. |
| 6,707,807 B1 * | 3/2004 | Menzel .................. 370/337 |
| 7,386,059 B2 | 6/2008 | Pilgram et al. |
| 2003/0147459 A1 | 8/2003 | Ryter |
| 2008/0248796 A1 * | 10/2008 | Oh et al. .................. 455/423 |

FOREIGN PATENT DOCUMENTS

| GB | 2277232 A | 10/1994 |
| JP | 2003051757 | 2/2003 |
| WO | 2005022809 A2 | 3/2005 |

OTHER PUBLICATIONS

International Search Report and Written Opinion correlating to PCT/EP2005/003491 dated Dec. 20, 2005.

(Continued)

*Primary Examiner* — Blane J Jackson

(57) ABSTRACT

Methods and device for transmitting a sequence of transmission bursts in a wireless device. The method includes transmitting a sequence of transmission bursts according to a transmission schedule. The method is characterized by: receiving, at a radio frequency integrated circuit, prior to a transmission of at least one transmission burst of the sequence, information representative of the timing of the transmission of the at least one transmission burst; and generating timing signals, by the radio frequency integrated circuit that implement the transmission schedule. A wireless device includes a base band integrated circuit adapted to determine a transmission schedule of a sequence of transmission bursts. The wireless device is characterized by including a radio frequency integrated circuit that is adapted receive information representative of the timing schedule and to autonomously control a transmission of the sequence of transmission bursts.

19 Claims, 2 Drawing Sheets

OTHER PUBLICATIONS

Technical Specification: Global System for Mobile Communications (GSM), "Digital cellular telecommunications system (Phase 2+); Multiplexing and multiple access on the radio path," 3GPP TS 45.002 version 5.11.0 Release 5; European Telecommunications Standards Institute (ETSI), Aug. 2003, 86 pages.

Technical Specification: Global System for Mobile Communications (GSM), "Digital cellular telecommunications system (Phase 2+); Modulation," GSM 05.04 version 8.1.2 Release 1999, European Telecommunications Standards Institute (ETSI), Feb. 2001, 11 pages.

Technical Specification: Global System for Mobile Communications (GSM), "Digital cellular telecommunications system (Phase 2+); Radio transmission and reception," GSM 05.05 version 5.0.0, European Telecommunications Standards Institute (ETSI), Mar. 1996, 48 pages.

ETSI Standards; Digital Cellular telecommunications System (Phase 2+); Radio Subsystem Synchronization (3GPP TS 45.010 version 4.5.0 Release 4) Aug. 2003.

ETSI Standards; Digital Cellular telecommunications System (Phase 2+); Multiplexing and Multiple Access on the Radio Path (3GPP TS 45.002 version 5.11.0 Release 5) Aug. 2003.

Technical Specification: Global System for Mobile Communications (GSM), "Digital Cellular telecommunications System (Phase 2+); Radio Subsystem Synchronization (3GPP TS 45.010 version 4.5.0 Release 4)", European Telecommunications Standards Institute (ETSI), Aug. 2003, 26 pages.

* cited by examiner

METHOD AND DEVICE FOR TRANSMITTING A SEQUENCE OF TRANSMISSION BURSTS

FIELD OF THE INVENTION

The present invention relates to methods and devices for transmitting a sequence of transmission bursts over an air interface.

BACKGROUND OF THE INVENTION

Modern wireless networks apply various techniques for conveying information and voice signals between a base station and multiple mobile phones (also referred to a mobile stations). These techniques include Time Division Multiplex Access (TDMA), Frequency Division Multiplex Access (FDMA) and Code Division Multiple Access (CDMA). Some wireless networks such as GSM networks utilize more than a single technique.

A single base station can exchange signals with multiple mobile phones. These mobile phones can be positioned at different distances from the base station. Accordingly, different mobile phones can be associated with different signal propagation periods. In order to compensate for timing differences resulting from the different propagation periods the base station determines, for each mobile phone, a timing advance value. The timing advance value changes in a relatively slow manner, especially in relation to the small timing differences between adjacent transmission bursts.

The following U.S. patents and patent applications, all being incorporated herein by reference, provide a brief overview of prior art timing advance methods and systems: U.S. Pat. No. 6,210,819 of Luders; U.S. Pat. No. 6,804,212 of Vallstrom et al.; U.S. patent application 2005/0053099 of Spear et al.; U.S. patent application 2004/0151143 of Abdesselem et al.; U.S. patent application 2004/0128095 of Oestreich; U.S. patent application 2003/0117995 of Koehn et al.; U.S. patent application 2003/0119524 of Carlsson; U.S. patent application 2004/0203921 of Bromhead et al.; U.S. patent application 2004/0246923 of Achard and U.S. patent application 2005/0025095 of Kim.

Modern mobile phones include multiple integrated circuits (also referred to as ICs or chips). A typical GSM transceiver includes a base band integrated circuit (BBIC) and a Radio Frequency integrated circuit (RFIC). The BBIC and the RFIC exchange control signals and data signals via a digital interface. Various companies, including Agere Systems, Philips, Silicon Laboratories, Sony, Renesas, Motorola, RF Micro Devices, Infineon and TTPcom defined a standardized interface known as DigRF. The DigRF includes a receive and transmit data line, various control lines, and a reference clock line.

The RFIC includes a reception path and a transmission path. The transmission path includes a fractional-N synthesizer, tunable amplifiers, various filters and modulators that can perform amplitude modulation and/or phase modulation. A modern cellular phone may be able to perform GMSK and 8PSK modulation. GMSK includes phase modulation only while 8PSK includes phase and amplitude modulation. In GMSK modulation each symbol is equivalent to one bit while in 8PSK modulation each symbol is equivalent to three bits.

The RFIC shapes the transmission bursts according to pre-defined power V time masks. The shaping is implemented by controlling the gain of a variable gain power amplifier that is located in the cellular phone front end. Typical power masks are defined in the following technical specification: ESTI TS 145 005 V. 5.9.0, titled "Digital cellular telecommunication system (Phase 2+); Radio transmission and reception (4GPP TS 45.005 version 5.9.0. Release 5), which is incorporated herein by reference.

3GPP defines five types of transmission bursts as part of the EGPRS and GSM standard: normal burst, frequency correction burst, synchronization burst, dummy burst and access bursts. Each burst is characterized by its overall length, its active length and its useful length. The active and useful lengths are shorter than the overall length.

The active length of the normal burst, frequency correction burst, synchronization burst and the dummy burst is one hundred and forty eight symbols. These symbols are followed by eight and a quarter guard period symbols. The access burst is much shorter. Its active length is eighty eight symbols. These symbols are followed by up to sixty eight and one quarter guard period symbols. During the guard period between the first transmission burst to another the mobile phone can perform a power ramp down and a power ramp up.

A (E)GPRS capable cellular phone can transmit a sequence of transmission bursts. The cellular phone has to guarantee that the transmission bursts are transmitted without overlaps and within the allocated time slot for the cellular phone. This goal is achieved by the BBIC that executes a complex and resource consuming transmission control scheme. The BBIC has a processor and additional circuitry that generate interrupts to the processor when certain transmission related events have to be triggered. This scheme is not effective as the BBIC has to handle many tasks and the frequency of interrupts decrease its performance.

There is a need to provide an efficient method and device for transmitting a sequence of transmission bursts without Base band intervention.

SUMMARY

A method and device for determining guard period characteristics, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

According to an embodiment of the invention the control scheme of a transmission of transmission burst sequences is simplified by allowing a base band integrated circuit to determine a timing schedule of a transmission of a sequence of multiple transmission bursts. The base band integrated circuit sends to a radio frequency integrated circuit transmission information representative of the timing schedule. The radio frequency integrated circuit can generate timing signals in order to implement the transmission schedule.

Conveniently, after receiving the transmission information the radio frequency integrated circuit controls the transmission autonomously, substantially without any assistance from the base band integrated circuit.

Conveniently, the transmission information relating to a transmission of a certain transmission burst is sent before the transmission of that transmission burst.

Accordingly, the base band integrated circuit is not required to perform a resource consuming process of monitoring the timing of transmission events. In many cases this dramatically reduces the amount of base band integrated circuit timing-related interrupts and Software exception routines required.

According to various embodiments of the invention the sequence of transmission bursts includes a first transmission burst of information that was modulated according to a first modulation scheme and a second transmission burst of information that was modulated according to a second modulation scheme, wherein the second modulation scheme differs from the first modulation scheme. Conveniently, the first modulation scheme is 8PSK and the second modulation scheme is GMSM.

The followed detailed description describes an adjustment of a power ramp down period between transmission bursts in various situations. It is noted that the invention can adjust the power ramp down period and even both power ramp up and power ramp down periods in response to various timing constraints. It is further noted that the described method and systems can be applied to generate power change patterns that differ from ramps.

It is further noted that FIG. 1-FIG. 4 are out of scale and that other control signals than those illustrated in these figures, as well as other logic values (for example low signal instead of high signal, signal values other than binary signals values) can be used to control the transmission sequence.

Figure 1:
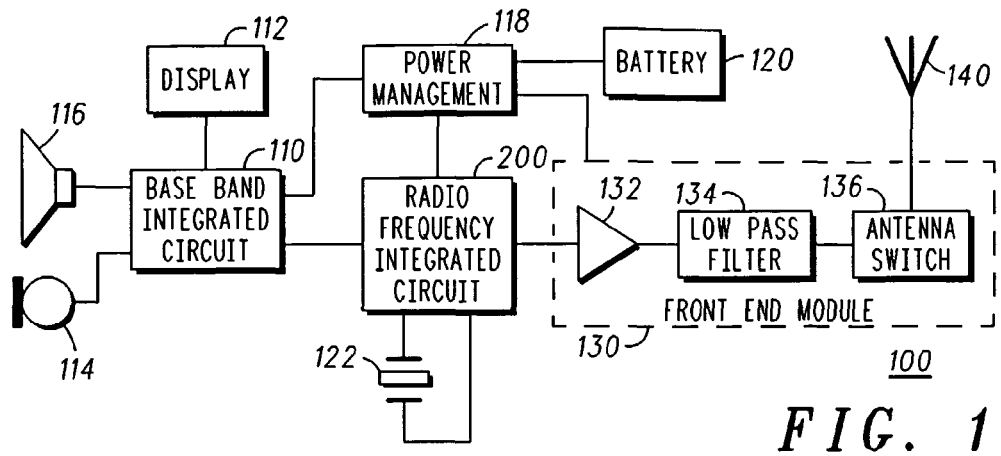
FIG. 1 illustrates a mobile phone, according to an embodiment of the invention.

FIG. 1 illustrates a mobile phone 100, according to an embodiment of the invention. Mobile phone 100 includes a base band integrated circuit (BBIC) 110, microphone 116, speaker 114, display 112, power management module 118, battery 120, reference crystal 122, antenna 140, front end module 130 and radio frequency integrated circuit (RFIC) 200.

BBIC 110 determines a transmission schedule of a sequence of transmission bursts. The transmission schedule can include modulation periods, transmission periods, guard periods, power ramp up and power ramp down periods, and the like.

Conveniently, the BBIC 110 determines the timing schedule in response to various parameters such as the timing advance associated with different burst types. For example, a normal burst can be associated with a timing advance value of up to sixty three symbols, and an access burst is associated with a timing advance value of zero.

If, for example, an access burst is followed by a normal burst that has a timing advance value between sixty one symbols and sixty three symbols then the power ramp down period of the access burst should be reduced. In such a case the BBIC 110 generates timing information representative of the reduced power ramp down period and the RFIC 200 will generate an access burst that has a reduced power ramp down period.

BBIC 110 is connected to the microphone 116, display 112, speaker 114 and power management module 118. The power management module 118 is also connected to battery 120, RFIC 200, front end module 130. The power management module 118 can apply various power reduction techniques.

The front end module 130 includes a power amplifier (PA) 132, an antenna switch 136 and a low pass filter (LPF) 134. The LPF 134 is connected between the PA and antenna. The antenna switch 136 selectively connects antenna 140 to a transmission path or to a reception path of the mobile phone 100. The reception path is not illustrated in further details, for simplicity of explanation.

BBIC 110 is connected to RFIC 200 via an interface such as a DigRf interface 160. This interface includes the strobe pin that is used to provide timing signals by the BBIC 110 to the RFIC 200. RFIC 200 sends control signals to PA 132 such as to provide a normal power ramp and a fast power ramp. These power ramps correspond to predefined power versus time masks.

Figure 2:
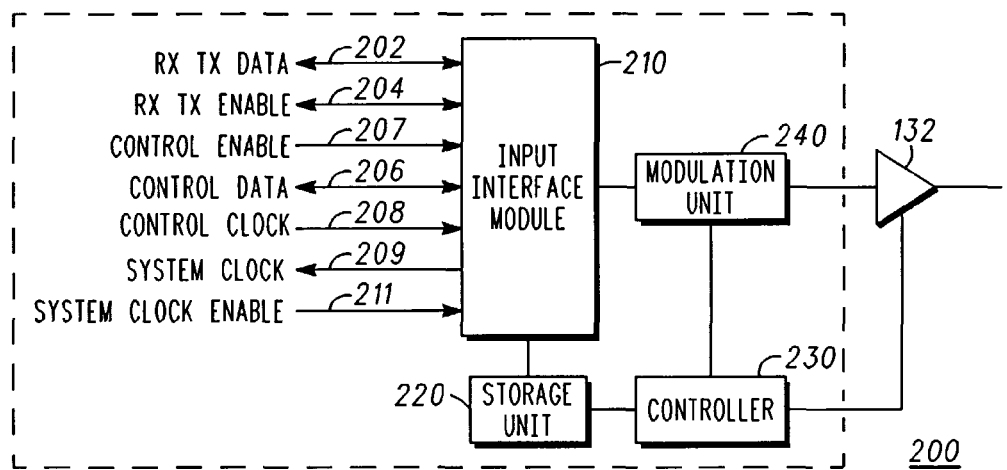
FIG. 2 illustrates an RFIC, according to an embodiment of the invention.

FIG. 2 illustrates RFIC 200, according to an embodiment of the invention. RFIC 200 includes an input interface module 210, a storage unit 220, a controller 230, and a modulation unit 240.

The input interface module 210 is connected, via a DigRf interface 160, to a BBIC 110. The modified DigRf interface 160 includes a bi-directional RxTxData line 202, a bi-directional RxTxEn line 204, a bi-directional CntrlData line 206, a CntrEn line 207, a CtrlClk line 208, a SysClk line 209 and a SysClkEn line 211. Data symbols are conveyed over the RxTxData line 202. The bi-directional RxTxEn line 204 is used to indicate that valid data is being provided over line 202. The bi-directional CntrlData line 206 is used to convey control signals. The CtrlClk line 208 conveys a clock signal, and the SysClk line 211 conveys a master clock signal while a SysClkEn is asserted.

The input interface module 210 includes an internal memory module and can store information and control signals that are later provided to other components of RFIC 200.

The storage unit 220 includes multiple registers or memory elements (RAM, ROM) that can store various transmission parameters. For example, it can store data representative of a normal power ramp, or a fast power ramp and the like.

A power ramp can be represented in various manners. For example, a power ramp can be represented by a sequence of values that when are sequentially sent to a power amplifier can generate the power ramp. Yet for another example, the power ramp can be represented by its duration and the difference between the maximal and minimal power values.

Conveniently, storage unit 220 stores information representative of a normal power ramp and of a short power ramp, but this is not necessarily so and it can store information that is representative of more than two different power ramps and of power patterns that differ from ramps.

Controller 230 conveniently includes hardware components that are capable of generating control signals that determine the timing of various transmission path and reception path events. For example, the controller 230 can determine when to start the modulation of valid transmitted data, when to start a transmission of the modulated data, when to end the transmission, when to generate a power ramp, and which power ramp to generate.

According to an embodiment of the invention the controller 230 can delay an assertion of a transmission enable signal until a guard period lapses from an end of a transmission of a pervious transmission burst.

According to another embodiment of the invention the controller 230 sends to the modulation unit 240 information representative of the guard period and in response the modulation unit 240 asserts a modulator active signal and negated this signal only after the modulation period and an additional guard period have expired. The late negation of the modulator active signal guarantees that the modulation unit 240 is not requested to start modulating another burst before the guard period lapsed. This helps maintain accurate timeslot boundaries on the air interface.

The modulation unit 240 can perform at least one modulation scheme. The inventors used a modulation unit 240 that performs GMSK and 8PSK modulation, but other modulation schemes can be supported by modulation unit 240. The method for performing various modulations are known in the art and do not require additional explanation.

Conveniently, the modulation unit 240 receives symbols from BBIC 110 and can control the phase and/or amplitude of the transmitted RF symbols. Typically such a modulation unit includes a GMSK modulator, an 8PSK modulator, a multiplexer, a phase modulator that includes a fractional-N PLL, and Coordinate Rotational Digital Computer (CORDIC) unit.

It is noted that the power of the transmitted symbols can be controlled by altering the gain of the power amplifier 164 but can also be controlled by adjusting the gain of another amplifier that is located before the power amplifier.

Non limiting examples of a modulator unit are provided at U.S. patent application 2004/0229592 of Matsui et al. U.S. patent application 2004/0180639 of Herzberg et al. U.S. Pat. No. 6,369,666 of Simon, et al, and PCT application publication number WO00/03523 of Piirainen et al., all being incorporated herein by reference. U.S. patent application 2004/0229592 of Matsui et al, describes a communication integrated circuit capable of performing various modulations such as GMSK modulation and 8-PSK modulation. U.S. patent application 2004/0180639 of Herzberg et al, describes a circuit arrangement for switching a mobile radio between two modulation modes.

The controller 230 can control the power amplifier 132 and force it to power ramp down (or power ramp up) according to predefined power masks. Conveniently, in order to generate a fast power ramp the controller 230 forces zeros into a digital to analog converter (not shown) which feeds the power amplifier 132. This forces the power amplifier 132 to power ramp down rapidly. Due to some analog filtering the steep power ramp down can be reduced but it still ramps downs quickly. The power ramp down can be very fast and depends upon the bandwidth of the front end module.

Figure 3:
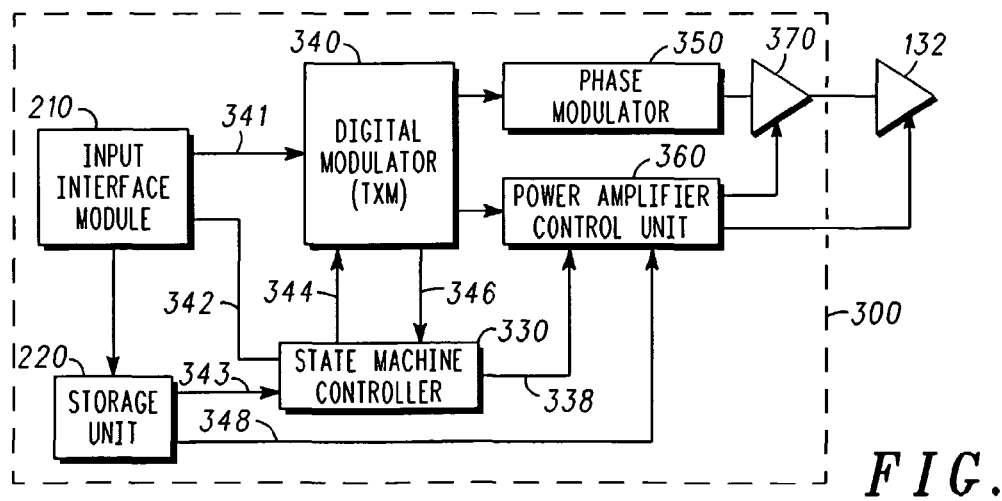
FIG. 3 illustrates in greater details a portion of the RFIC, according to an embodiment of the invention.

FIG. 3 illustrates in greater details RFIC 300 according to an embodiment of the invention.

RFIC 300 includes an input interface module 210, a storage unit 220, a state machine controller 330, a power amplifier control unit 360, a transmit digital modulators (TXM) 340, a phase modulator 350 and a variable gain amplifier 370.

The input interface module 210 is connected to TXM 340 in order to provide data symbols (denoted "TX DATA" 341) to be modulated. The input interface module 210 is connected to the state machine controller 330 and sends it a valid_data signal 342 that is high when valid TX data 341 is provided to TXM 340. The storage unit 220 sends to the state machine controller 330 a ShutdownDelay value 343 that defines the guard period.

The state machine controller 330 sends a modulator_enable signal 344 to the TXM 340. The modulator_enable signal 344 notifies the TXM 340 when to start a modulation sequence and when to end the modulation sequence.

The TXM 340 sends a modulator_active signal 346 to the state machine controller 330. This signal prevents the state machine controller 330 or any other component of the RFIC 200 to initiate a new modulation session. The modulator_active signal 346 remains high for a guard period defined by the ShutdownDelay, after the modulator_enable_signal 344 is negated.

The state machine controller 330 sends the power amplifier control unit 360 two signals—a short/normal power ramp signal 348 and a transmit_enable signal 338. The short/normal power ramp signal 348 indicates whether to perform a normal or a short power ramp. The transmit_enable signal 338 initiates the activation of the power amplifier. Immediately after transmit_enable is asserted the power amplifier control unit 360 controls a power ramp up. Once the transmit_enable signal 338 is negated the power amplifier control unit 360 controls a power ramp down in response to the short/normal power ramp signal 348. When the transmit_enable signal 338 is negated, after a transition path latency period the valid data signal 342 is negated.

The TXM 340 conveniently includes a GMSK modulator and a 8PSK modulator that receive base band symbols. The outputs of both modulators are connected to a multiplexer and to a control unit that selectively provides (according to the applied modulation scheme) the output symbols to a phasor rotator block (CORDIC).

The CORDIC performs rectangular to polar conversion. The CORDIC outputs amplitude data to the power amplifier control unit 360 and also outputs phase data to a phase derivative block. The phase derivative block sends frequency data to the phase modulator 350. The amplitude data is used, in 8PSK modulation to control the gain of the variable gain amplifier 370.

Figure 4:
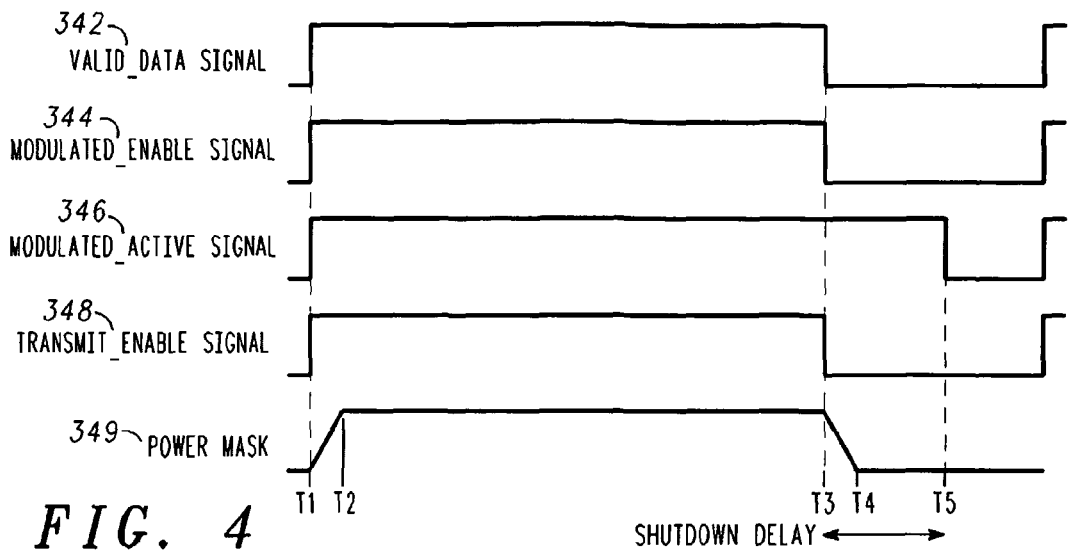
FIG. 4 is a timing diagram of various signals, according to an embodiment of the invention.

FIG. 4 is a timing diagram of various signals, according to an embodiment of the invention.

The timing diagram illustrates various signals that are generated during the transmission of a single transmission burst. In addition, for simplicity of explanation, the processing delays or propagation delays of various signals were omitted. For example, minor delays between the assertion of Valid_data signal 342, modulator_enable_signal 344 and modulator_active signal 346 were omitted. Those of skill in the art will appreciate that these signals are not asserted simultaneously as the state machine controller 330 and the TXM 340 are required to receive a certain signal, respond to the signal and then output another signal.

The power mask that is generated during the transmission of a burst is represented by POWER_MASK signal 349.

At T1 valid_data signal 342 is asserted to indicate that there is valid data to modulate. At T1 or before T1 a ShutdownDelay value 343 (not shown) is sent to the state machine controller.

At T1, or shortly after T1 modulator_enable_signal 344 is asserted by the state machine controller 330 in order to request the TXM 340 to start modulating. Shortly after the assertion of modulator_enable_signal 344 TXM starts a modulating sequence and accordingly asserts modulator_active signal 346.

The state maching controller 330 also asserts transmit_enable signal 338 and between T1 and T2 the power amplifier performs a power ramp up.

At T2 the active phase modulator 350 and power amplifier control unit 360 send modulated symbols that are part of the active part of the transmission burst (TB).

At T3 valid_data signal 342 is negated to indicate that the active part of transmission burst (TB) ended. At T3, or shortly after T3 (due to line up latency) modulator_enable_signal 344 is negated.

At T3 or shortly after T3 transmit_enable 338 is negated and the power amplifier control unit 360 controls a power ramp down that is responsive to a previously provided short/normal power ramp signal 348. The power ramp down ends at T4.

At T5, modulator_active signal 346 is negated. The difference between T3 and T5 corresponds to a guard period plus lineup latency that is defined by the ShutdownDelay value 343. As long as modulator_active signal 346 is high the state machine controller 330 will not assert the modulator_enable_signal 344 or the transmit_enable signal 338.

If, for example, the burst is an access burst that is followed by a normal burst that has a timing advance value of zero to sixty symbols then the power ramp down associated with the access burst will be normal (for example about two symbols) and the difference between T2 and T3 (when transmitting the access burst) is about eighty eight symbols. The Shutdown-Delay is about eight and a quarter symbols long for a timing advance of 60 and about 68 and a quarter symbol long for a timing advance of 0. The shutdowndelay will be constant, about 8 and a quarter symbol long for successive normal bursts.

If, for example, the burst is an access burst and it is followed by a normal burst that has a timing advance value of sixty three symbols than the power ramp down will be fast (for example—about three quarters of a symbol). The shut down period will be six and a quarter symbols long. The fast power ramp down is applied even if the timing advance is sixty one or sixty two.

In general, whenever the time difference between the active lengths of two consecutive bursts is smaller than the difference between the timing advance associated with these bursts then the guard time and either a power ramp up or power ramp down period should be modified in order to prevent burst overlap.

Figure 5:
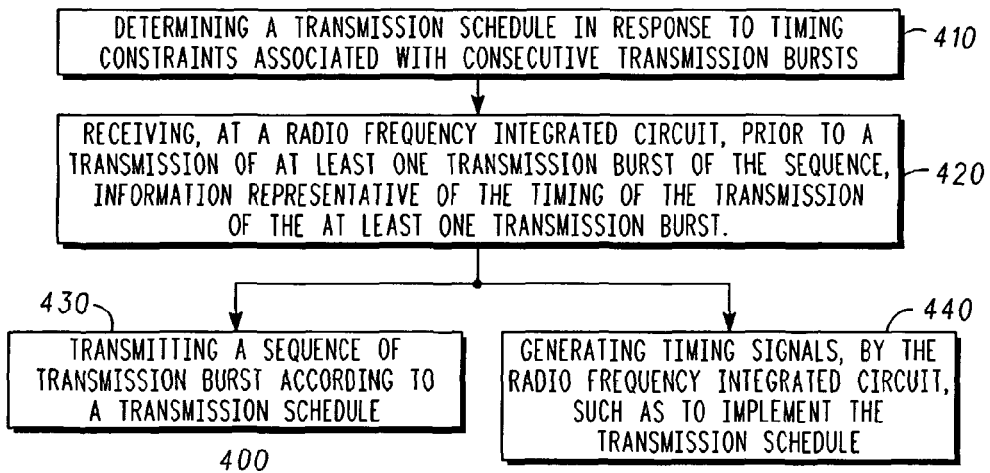
FIG. 5 and FIG. 6 are flow charts of methods for transmission of transmission bursts, according to an embodiment of the invention.

FIG. 5 illustrates method 400 for transmitting a sequence of transmission bursts in a wireless device.

Method 400 starts by stage 410 of determining a transmission schedule in response to timing constraints associated with consecutive transmission bursts. Conveniently, timing constraints associated to a transmission burst are responsive to a length of the transmission burst and to a timing advance value. Conveniently it includes the power ramp period. Referring to the example set forth in FIG. 2 the BBIC 110 determines which transmission bursts to send and the exact time of various transmission events associated with the transmission. Usually the determination is responsive to an allocation of timeslots by a base station and to timing advance values sent by the base station. These timing advance values are usually updated in a periodical manner by the base station.

Stage 410 is followed by stage 420 of receiving, at a radio frequency integrated circuit, prior to a transmission of at least one transmission burst of the sequence, information representative of the timing of the transmission of the at least one transmission burst. This stage can include receiving information representative of the timing of a transmission of a certain transmission burst before this transmission burst is transmitted and even before a transmission of one or more other transmission bursts that precede that certain transmission burst. For example, assume that a transmission sequence includes four transmission bursts TB1-TB4 the information representative of the timing of the transmission of TB4 can be provided before any of TB1-TB3 are transmitted. Typically, the base band integrated circuit and the radio frequency integrated circuit exchange information on a single transmission burst basis, but this is not necessarily so. Referring to the example set forth in FIG. 2 the timing information as well as data to be modulated is sent by the BBIC 110 to the RFIC 200. The timing information can be stored at the storage unit 210 to be later provided to other components of RFIC 200.

Stage 420 is followed by stages 430 and 440. Stage 430 includes transmitting a sequence of transmission bursts according to a transmission schedule. Stage 440 includes generating timing signals, by the radio frequency integrated circuit, such as to implement the transmission schedule. Conveniently, stage 440 includes delaying a transmission enable signal until a guard period plus line up latency lapses from an end of a transmission of a pervious transmission burst. Conveniently, the transmission bursts include bursts of different lengths. Referring to the example set forth in FIG. 2 the RFIC 200 modulates transmission data, issues timing signals that allow the modulation and controls the gain of the power amplifier such as to comply with predefined power masks.

Figure 6:
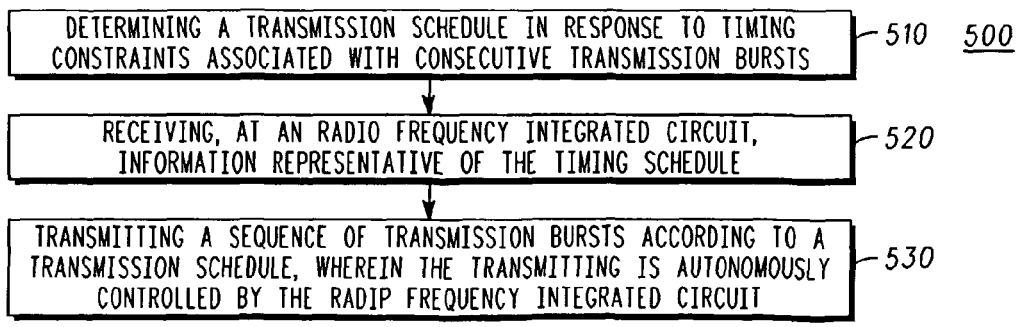

FIG. 6 illustrates method 500 for transmitting a sequence of transmission bursts in a wireless device, according to an embodiment of the invention.

Method 500 starts by stage 510 of determining a transmission schedule in response to timing constraints associated with consecutive transmission bursts. Conveniently, timing constraints associated to a transmission burst are responsive to a length of the transmission burst and to a timing advance value. Conveniently this stage includes determining a power ramp period, and especially a power ramp down period.

Stage 510 is followed by stage 520 of receiving, at a radio frequency integrated circuit, information representative of the timing schedule.

Stage 520 is followed by stage 530 of transmitting a sequence of transmission bursts according to a transmission schedule, wherein the transmitting is autonomously controlled by the radio frequency integrated circuit. Conveniently, stage 530 includes delaying a transmission enable signal until a guard period plus line up latency lapses from an end of a transmission of a pervious transmission burst. Referring to the example set forth in FIG. 2, once the BBIC has sent timing information such as ShutdownDelay value and fast/normal power ramp value it does not intervene in the transmission process. The BB can perform various tasks that are not related to the timing of transmission events.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A method for transmitting a sequence of transmission bursts in a wireless device, the method comprises:
    transmitting the sequence of transmission bursts according to a transmission schedule, wherein transmitting comprises: delaying a transmission enable signal until a guard period plus lineup latency lapses from an end of a transmission of a pervious transmission burst;
    receiving, at a radio frequency integrated circuit, prior to a transmission of at least one transmission burst of the sequence, information representative of the timing of the transmission of the at least one transmission burst; and
    generating timing signals, by the radio frequency integrated circuit that implement the transmission schedule.

2. The method according to claim 1 wherein the stage of receiving is preceded by determining the transmission schedule in response to timing constraints associated with the consecutive transmission bursts.

3. The method according to claim 2 wherein the timing constraints associated to a transmission burst is responsive to a length of the transmission burst and to a timing advance value.

4. The method according to claim 2 wherein the determining comprise determining a power ramp down period.

5. The method according to claim 2, wherein the sequence of transmission bursts comprise bursts of different lengths.

6. A method for transmitting a sequence of transmission bursts in a wireless device, the method comprises:
transmitting the sequence of transmission bursts according to a transmission schedule;
determining the transmission schedule in response to timing constraints associated with consecutive transmission bursts and determining a power ramp down period; and
receiving, at a radio frequency integrated circuit, information representative of the timing schedule;
wherein the transmitting is autonomously controlled by the radio frequency integrated circuit.

7. The method according to claim 6 wherein the timing constraints associated to a transmission burst is responsive to a length of the transmission burst and to a timing advance value.

8. The method according to claim 6 wherein the stage of transmitting comprises delaying a transmission enable signal until a guard period lapses from an end of a transmission of a pervious transmission burst.

9. The method according to claim 6 wherein the sequence of transmission bursts comprise bursts of different lengths.

10. A wireless device, comprising:
a base band integrated circuit adapted to determine a transmission schedule of a sequence of transmission bursts; and
a radio frequency integrated circuit that is adapted receive information representative of the timing schedule and to autonomously control a transmission of the sequence of transmission bursts, wherein the wireless device is further adapted to determine the transmission schedule in response to timing constraints associated with consecutive transmission bursts, and to determine a power ramp period.

11. The wireless device according to claim 10 wherein the timing constraints associated to a transmission burst are responsive to a length of the transmission burst and to a timing advance value.

12. A method for transmitting a sequence of transmission bursts in a wireless device, the method comprises:
transmitting the sequence of transmission bursts according to a transmission schedule,
wherein the sequence of transmission bursts comprises a first transmission burst of information that was modulated according to a first modulation scheme and a second transmission burst of information that was modulated according to a second modulation scheme, wherein the second modulation scheme differs from the first modulation scheme;
receiving, at a radio frequency integrated circuit, prior to a transmission of at least one transmission burst of the sequence, information representative of the timing of the transmission of the at least one transmission burst; and
generating timing signals, by the radio frequency integrated circuit that implement the transmission schedule.

13. A method for transmitting a sequence of transmission bursts in a wireless device, the method comprises:
transmitting the sequence of transmission bursts according to a transmission schedule wherein the sequence of transmission bursts comprises a first transmission burst of information that was modulated according to a first modulation scheme and a second transmission burst of information that was modulated according to a second modulation scheme, wherein the second modulation scheme differs from the first modulation scheme; and
receiving, at a radio frequency integrated circuit, information representative of the timing schedule;
wherein the transmitting is autonomously controlled by the radio frequency integrated circuit.

14. A wireless device, comprising:
a base band integrated circuit adapted to determine a transmission schedule of a sequence of transmission bursts, wherein the sequence of transmission bursts comprises a first transmission burst of information that was modulated according to a first modulation scheme and a second transmission burst of information that was modulated according to a second modulation scheme, wherein the second modulation scheme differs from the first modulation scheme; and
a radio frequency integrated circuit that is adapted to receive, prior to a transmission of at least one transmission burst of the sequence of transmission bursts, information representative of the timing of the transmission of the at least one transmission burst of the sequence of transmission bursts, and to generate timing signals that implement the transmission schedule.

15. The wireless device according to claim 14 wherein the device is further adapted to determine the transmission schedule in response to timing constraints associated with consecutive transmission bursts.

16. The wireless device according to claim 15 wherein the timing constraints associated with a transmission burst are responsive to a length of the transmission burst and to a timing advance value.

17. The wireless device according to claim 15 wherein the wireless device is further adapted to determine a power ramp period.

18. The wireless device according to claim 14 wherein the radio frequency integrated circuit is adapted to delay a transmission enable signal until a guard period plus line up latency lapses from an end of a transmission of a pervious transmission burst.

19. The wireless device according to claim 14 wherein the sequence of transmission bursts comprise bursts of different lengths.

* * * * *